United States Patent [19]
Basiev et al.

[11] Patent Number: 5,461,635
[45] Date of Patent: Oct. 24, 1995

[54] SOLID STATE LASER WITH SUPERBROADBAND OR CONTROL GENERATION SPECTRUM

[76] Inventors: Tasoltan T. Basiev, 38 Vavilov str., Moscow 117942, Russian Federation; Sergey B. Mirov, 2413 Jacobs Rd., Birmingham Ala. 35216; Petr G. Zverev, 38 Vavilov str., Moscow, 117942; Ivan V. Kuznetsov; Ramaz Sh. Tedeev, both of 8/50 Stepana Rasina str., St. Peterburg 198035, all of Russian Federation

[21] Appl. No.: 42,217

[22] Filed: Apr. 2, 1993

[51] Int. Cl.$^6$ ....................................... H01S 3/16
[52] U.S. Cl. .................. 372/42; 372/19; 372/20; 372/23; 372/102
[58] Field of Search .................. 372/42, 41, 19, 372/20, 23, 102, 107, 108

[56] References Cited

U.S. PATENT DOCUMENTS

| | | | |
|---|---|---|---|
| 3,970,960 | 7/1976 | Mollenauer | 372/42 |
| 4,426,707 | 1/1984 | Martin et al. | 372/108 X |
| 4,519,082 | 5/1985 | Schneider | 372/42 |
| 4,862,469 | 8/1989 | Couillaud et al. | 372/33 |
| 5,166,949 | 11/1992 | Perlmutter | 372/19 |
| 5,267,254 | 11/1993 | Schneider et al. | 372/42 |

OTHER PUBLICATIONS

"Color Center Lasers", K. R. German, Proc. Soc. Photo–Opt. Instrum. Eng. (SPIE vol. 247) 1980, pp. 90–94 no month available.

"Stretched Pulse Shaping And Measurement", Boyer et al., Optic Communications 90, Jun. 1992, pp. 21–26.

*Primary Examiner*—Rodney B. Bovernick
*Assistant Examiner*—Hemang Sanghavi
*Attorney, Agent, or Firm*—Myron Greenspan

[57] ABSTRACT

The subject invention relates to a new regime of lasing—superbroadband or pre-assigned spectral composition lasing. A new cavity construction and application of room temperature operable LiF color center crystals provide generation with a spectral width in one pulse practically coinciding with the luminescence spectrum of the active medium. The innovation consists of the pumping means, providing a volumetric pumping, of the active medium with a spatial profile and dimensions of the pumped zone of the crystal, interconnected with the desired spectral width, dispersion of the grating and focus of the intracavity focusing element, the means for separating from the emission radiation desired wavelengths, means for directing the radiation of the desired wavelengths through multiple passes through the active medium, radiation of different wavelengths being passed through different associated trajectories in the cavity and active medium to stimulate emissions at the desired wavelengths and means for suppressing the secondary off-axis laser modes to avoid mode competition thereby maximizing the amplification of the desired spectral components. In addition to this a realization of the superbroadband radiation frequency doubling by means of simultaneous disperse compensation of different phase matching angles in one nonlinear crystal is described.

20 Claims, 4 Drawing Sheets 5,461,635

SOLID STATE LASER WITH SUPERBROADBAND OR CONTROL GENERATION SPECTRUM

BACKGROUND OF THE INVENTION

1. Field of the Invention

The present invention relates to the field of Quantum electronics, and more particularly to lasers that can be widely used as a powerful tool for solving problems in various fields of science and technology, such as—laser spectroscopy, photochemistry, photobiology, medicine, optical telecommunication, color television, color microscopy, color holography, information coding, and technology control.

Primarily, the invention can be used in cases when polychromatic laser emission with a pre-assigned oscillation spectrum is required, for example, continuum spectrum, multicolor sections of continuum spectrum or multicomponent linear spectrum with required spectral distribution of lasing power.

2. Description of the Prior Art

There is known a method for superbroadband or control generation spectrum lasing [A. G. Zhiglinskiy, A. M. Izmailov "Device for coherent electromagnetic radiation" Russian patent No. 4318986 issued Sep. 21, 1987], where definite sections of the active medium, corresponding to the pre-assigned wavelengths of laser oscillation (superbroadband continuum is a particular case of a control oscillation spectrum lasing), are simultaneously pumped. The pre-assigned wavelength radiations are chosen from the radiation of the fixed sections of active medium and simultaneously directed together with stimulated radiation of the pre-assigned wavelengths at their own (for each wavelength) pumped sections of active medium.

There is a laser realizing this method (see FIG. 1 ) and containing: pump system, active medium (AM) (solution of organic dye) and a resonator, consisting, in it's turn, of a dispersive element (D), operating in an autocollimation regime, two achromatic objectives ($O_1$ and $O_2$) and a highly reflective mirror $M_1$. The first objective is optically connected with the dispersive element, it being known that the active medium is placed in it's focal plane. The second objective $O_2$ is placed from another side of the active medium, being optically connected with a highly reflective mirror $M_1$. The distances between the mirror $M_1$ and the active medium AM, between the active medium AM and the second objective $O_2$ are selected so that the objective $O_2$ reflects the active medium on a working surface of the mirror $M_1$. The described laser works as follows. In accordance with the pre-assigned spectrum of laser emission, sections of the active medium to be pumped are defined. These sections are defined in the focal plane of the first objective, according to dispersion of the selective element (D). The defined sections of the active medium are pumped by the radiation of the pumping system. Spontaneous radiation, emitted by the pumped sections of the active medium arrive at the objective $O_l$ and, in a parallel pencil of rays, is directed to the dispersive element D. After autocollimation reflection the radiation returns to the appropriate sections of the active medium AM, being amplified there. Then the second objective $0_2$ focuses this radiation on the end mirror $M_1$ and, after reflection, this radiation is focused again into the same pumped zones of the active medium.

There is known another laser [A. G. Zhiglinskiy, A. M. Izmailov "Laser with a control generation spectrum and spectral component brightness regulation" Russian patent No. 4867886 issued Oct. 2, 1990, and A. G. Zhiglinskiy, A. M. Izmailov "Controlled spectrum generation laser" U.S. patent application Ser. No. 07/483112 filed Feb. 21, 1991.] (see FIG. 2), realizing this known method and comprising an active media AM with broadband luminescent spectra (solutions of organic ayes), a dispersive element D (diffraction grating), resonator mirror $M_1$ and a lens, to be installed between the dispersive element D and the active media AM and, at last,—a device PL for AM pumping. This pumping device PL pumps different sections of the active media, lying on various distances from the resonator optical axis. Spontaneous emission (and after following passages—induced radiation) from this section is reflected by mirror $M_1$ back to the pumped sections and is amplified there. Between the mirror $M_1$ and the interresonant lens L radiation is parallel to the optical axis. After refraction on the lens L the radiation is directed towards the grating D under various angles. The condition of the autocollimation reflections from the grating D for the radiation, emitted by various sections of the active media AM, will be fulfilled for the various wavelength. The radiation of this wavelength, after diffraction on the grating D, returns back to the pumped sections and is amplified there.

The main shortcoming of this previously used approach and associated lasers is the fact that these lamers can operate only with an active media having a so called plane configuration, because all the defined and pumped sections or zones of active media $AM_1$, $AM_2$, $AM_3$, etc. should be placed in one plane—focal plane—of the first objective $O_1$ see FIG. 1). This requirement significantly restricts the selection of the active media (only highly concentrated dyes are suitable) and eliminates the opportunity vf using volumetric active elements having a length along the resonator's optical axis. These aforementioned active media (mostly solid state—with a broadband emission spectra) are widespread, reliable, easy to handle and can provide high output power laser emission. Additionally, local pumping is principally impossible in many cases, for example, in chemical and gas lasers with electron or electrical pumping, solid state or dye lasers with flashlamp pumping.

There is a second important shortcoming in the described above lasers. Besides modes with the pre-assigned wavelengths there simultaneously appear a large quantity of secondary parasitic modes, propagating under various angles to the resonator axis, passing through two or more pumped zones of the active medium, providing competition with the main modes and decreasing the range of broadband oscillation.

Besides, the described lasers exhibit very high angle divergency of it's output oscillation.

SUMMARY OF THE INVENTION

Essentially, the invention includes:

volumes of active media with a broadband luminescence are pumped (for example optically) for producing population inversion;

radiation of all the pre-assigned wavelengths, possible for the fixed active media, is separated from the spontaneous emission of the pumped volumes of the active media (in the case of generation with continuum spectrum this step is excluded);

separated radiations of all the specified wavelengths are simultaneously directed through the indicated active medium, having different paths for every wavelength;

the specified spontaneous emission causes stimulated radiation, which, in it's turn, is repeatedly directed through specified active medium through the indicated paths;

simultaneously, suppression of all the secondary off axes modes is performed. As a result the radiation of every assigned wavelength is amplified without any competition and independently.

the certain correlation of the focus length distance between additional lens and nonlinear crystal-doubler can provide disperse compensation of phase matching angles in the nonlinear crystal for superbroadband frequency doubling and simultaneous obtaining laser output in a very wide region of the optical spectrum.

Due to the above described performance there appear the opportunity of maximal laser output spectral composition expanding up to spectral composition close to the active medium luminescence spectral bandwidth.

DESCRIPTION OF A PREFERRED EMBODIMENT

Figure 1:
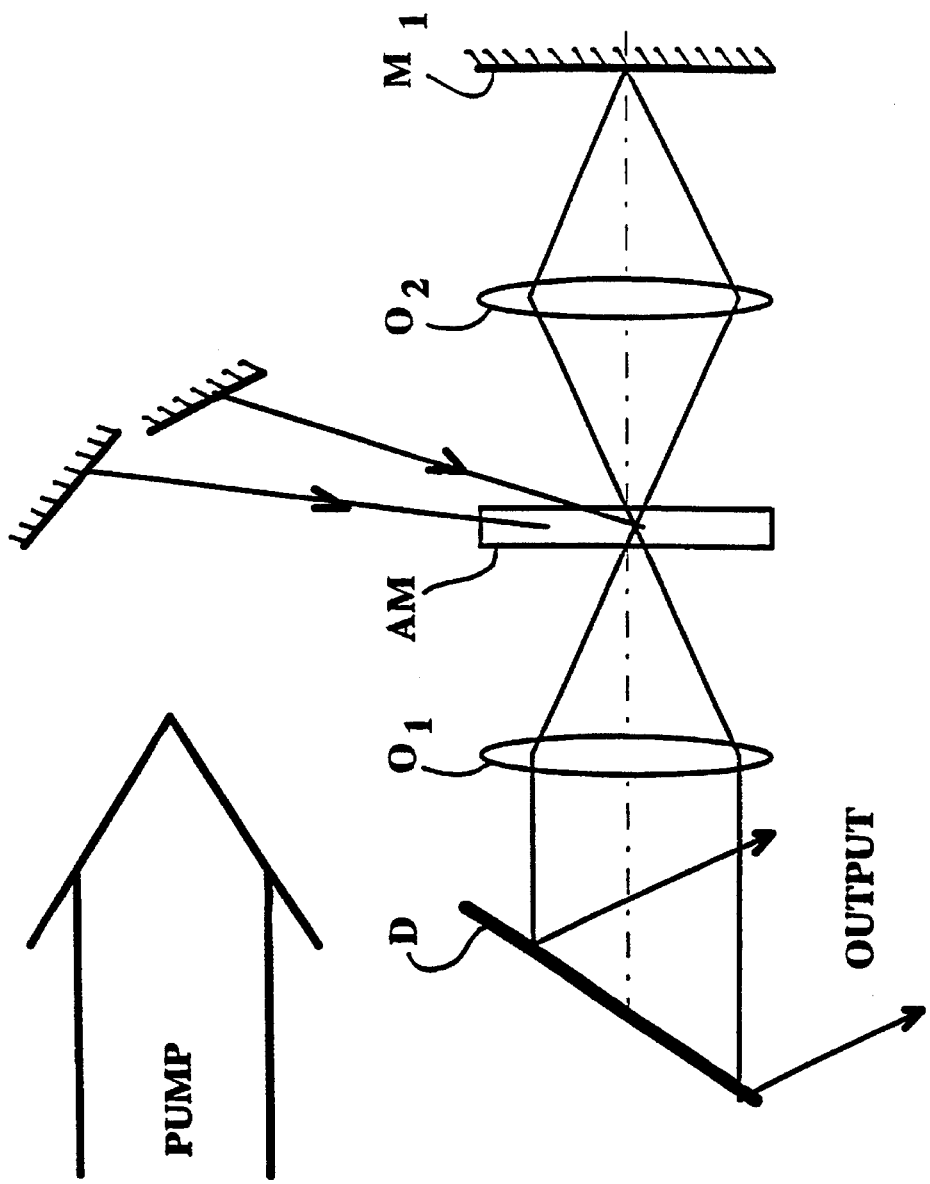
FIGS. 1 and 2 are schematic diagrams of solid state lasers of the prior art.
Figure 2:
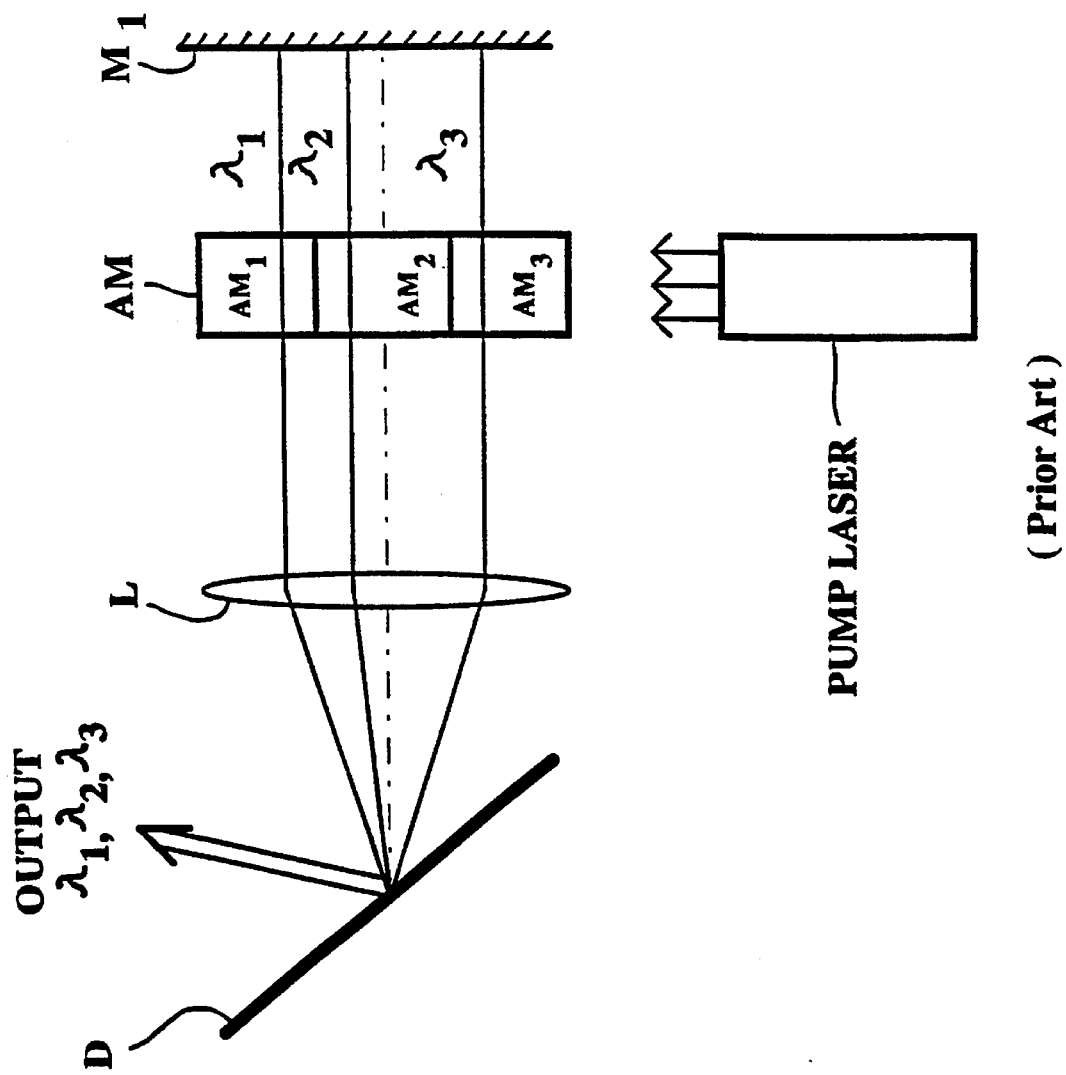
Figure 3:
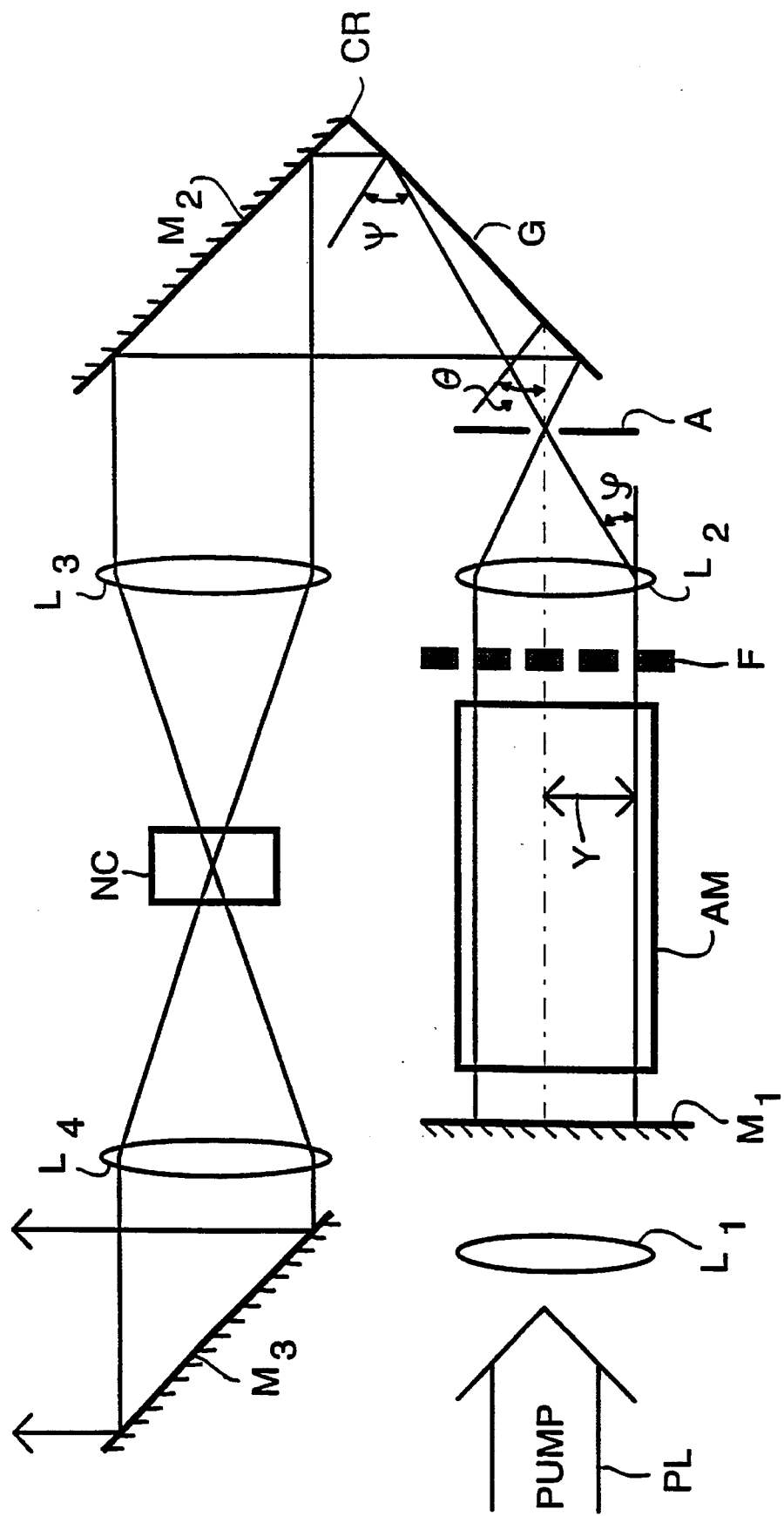
FIG. 3 is a schematic diagram of the solid state laser with superbroadband spectrum of the present invention.

Other advantages of the present invention will be apparent from the detailed description of the invention and the appended drawing (see FIG. 3). The laser includes the following optical parts shown on FIG. 3:

pump laser PL. In our particular case—pulsed Nd:YAG laser with first and second harmonic generation;

$L_1$—Quartz cylindrical lens with an antireflection coating for formation necessary line profile of the pumping beam;

$M_1$—input dichroic dielectrical mirror is transparent for the pumping radiation (1,064 and 0.53 µm), but has high reflectivity for the oscillation spectral region (0.84–1.1 and 1.1–1.24 µm for $LiF:F_2^+$ and $LiF:F_2^-$ active elements, respectively);

AM—active media (LiF color center crystals with $F_2^-$ or $F_2^+$ centers);

$L_2$—Quartz cylindrical lens with antireflection coating over all emission spectral range;

CR—corner reflector, that includes a reflecting diffraction grating (G) (1200 lines/ram) and high reflecting (for the range 0.84–1.1 and 1.1–1.24 µm) dielectric mirror $M_2$;

$L_3$—lens with antireflection coatings for the disperse compensation of nonlinear crystal phase matching angles over the wide spectral range of oscillation;

NC—nonlinear crystal-laser radiation frequency doubler (Lithium Iodate nonlinear crystal with antireflection coatings);

$L_4$ and $M_3$—lens and mirror for outputting the laser radiation;

A—metal slit aperture with X-Y aligning mechanism;

F—filtering element (only for control generation spectrum regime).

It is possible to install an aperture with a control slit width. Slit width "h" in the direction of the diffraction grating dispersion can be approximately defined by the expression:

$$h = \sqrt{L(\lambda_s - \lambda_1)} \quad , \tag{1}$$

L is a resonator length, $\lambda_s$ and $\lambda_1$-wavelengths of the short and long tails of output oscillation spectrum, respectively. For the case of $LiF:F_2^-$ active medium $\lambda_s$=1.1 µm; $\lambda_1$ =1.25 µm and, for example, for 25 cm resonator length one can calculate the slit width h=0.8 mm.

In our particular resonator one can use various types of volumetric active media with broadband emission spectra. All types of laser crystals activated by the transitional metal ions and featuring a broad oscillation band are, in principal, suitable. For example, chromium activated alexandrite, rare earth and yttrium aluminum garnet, forsterite, complex fluorides such as LiCAF, LiSAF and Ti-doped sapphire. Due to a very high gain coefficient and broad emission spectra color center crystals are also very promising. There can be used well-known crystals based on alkali-halide such as KCl, KBr, NaCl with $F_A(II)$, $F_B(II)$, $F_2^+$, $F_A(TI)$ color center that operate at low temperatures. In this case, they should be mounted in a cryoster to be installed in the AM position in FIG. 3. But in our described case, we used room temperature color center lithium fluoride crystals (LiF).

Color Center Lasers (CCL) based on LiF crystals have been shown to be a reliable alternative either to dye or to Ti and Cr activated crystalline laser systems [T. T. Basicy, S. B. Mirov V. V. Osiko, J. of QE. 24, 1052 (1988)]. Their advantages over dye lasers, as we have mentioned above, include wide wavelength tunability, compactness, long operational lifetime, rigidity and case of handling. Due to their high gain the CCL feature some advantages over the impurity activated tunable solid state lasers such as low sensitivity to the quality of the cavity optical elements and to the spatial angular and spectral characteristics of the pump radiation.

LiF color center active media can be installed in sequence (in the direction of grating dispersion) in accordance with their luminescent spectra. Orating angle dispersion "D"; focusing distance of the focusing element "f", combined width "d" of the active media pumped volumes in the direction of the grating's dispersion and combined generated spectral width "Δλ" should be represented by the expression $$\Delta\lambda \cong 1/D \times \text{arctg} (d/f) \tag{2}$$

For our concrete scheme (see FIG. 3) we used a diffraction grating with dispersion:

$$D=2 \text{ tg}\theta/\lambda \cong 1 \text{ µm}, \tag{3}$$

where θ– is a reflection angle. For example, let us estimate the combined geometrical beam width "d" of the pump volumes for $LiF:F_2^-$, $LiF:F_2^+$, separately, and when they are installed in the resonator in sequence, for the focusing length f=5 cm. According to (2)

$$d = f \times tg \, \Delta \lambda \tag{4}$$

-continued

| | | |
|---|---|---|
| LiF:F$_2^-$ | $\Delta\lambda \simeq 0.15$ μm | $d \simeq 0.8$ cm |
| LiF:F$_2^+$ | $\Delta\lambda \simeq 0.26$ μm | $d \simeq 1.3$ cm |
| both crystals | $\Delta\lambda \simeq 0.4$ μm | $d \simeq 2$ cm |

This estimation gives us the dimensions of the geometrical width of the pumping beam, that can be easily reached. The filtering element "F", which is installed in the resonator only in a case of control generated spectrum, should be transparent for the radiation with required spectral composition. Position and width of transparent parts in the direction of the grating dispersion should be taken according to the required wavelength and spectral width of the generating spectral segments. Due to the absence of mode competition the output power with and without the filtering element should be constant.

The laser in accordance with the invention operates as follows:

Active media are longitudinally or quasi-longitudinally pumped through the input mirror $M_1$ by the radiation of the first (LiF:F$_2^-$) or second harmonic (LiF:F$_2^+$) of the pulsed neodymium laser, having special line profile with a length "d" in accordance with the formula (4). If the pump power density is less than 1 MW/cm$^2$, or if the laser radiation output is weak, it is possible to increase the pump energy density by the quartz cylindrical lens $L_1$. Spontaneous emission from the whole pumped volume of the active media is focused by the cylindrical lens $L_2$ into the slit aperture A, which in it's turn separate from the spontaneous emission only part of it, that is spread parallel to the resonator axis. Radiation, separated from the aperture is directed to the diffraction grating under various angles "Ψ", $$\Psi = \theta + \text{arctg } y/f \qquad (5)$$

where y is the distance from the optical axis, f is the focus distance of the focusing element $L_2$, θ is the angle between the resonator optical axes and perpendicular to the grating plane. This separated radiation is diffracted on the grating, working in the autocollimation regime in the first order of diffraction as the back reflector and returns back to the aperture. The aperture, in it's turn separates from the diffracted radiation only the radiation of the main laser modes, secondary laser modes, which spread nonparallel to the optical axis, are expelled from the process of generation formation. The radiation of the main laser modes, having their own wavelengths, is collimated by focusing element $L_2$ and directed back to the active media. Each mode has it's own trajectory. This radiation and the radiation provoked by it are reflected exactly back by the end mirror. This process gives rise to the superbroadband oscillation. The zero order of the diffraction is used as the laser output. In order to provide the constant direction of the output beam while rotating the grating, the special dielectric mirror $M_2$ with high reflectivity is mounted together with the grating on the same stage at right angle to each other. The diffraction grating G and mirror $M_2$ work as a corner reflector. In this manner the output beam is turned through 180 degrees.

Figure 4:
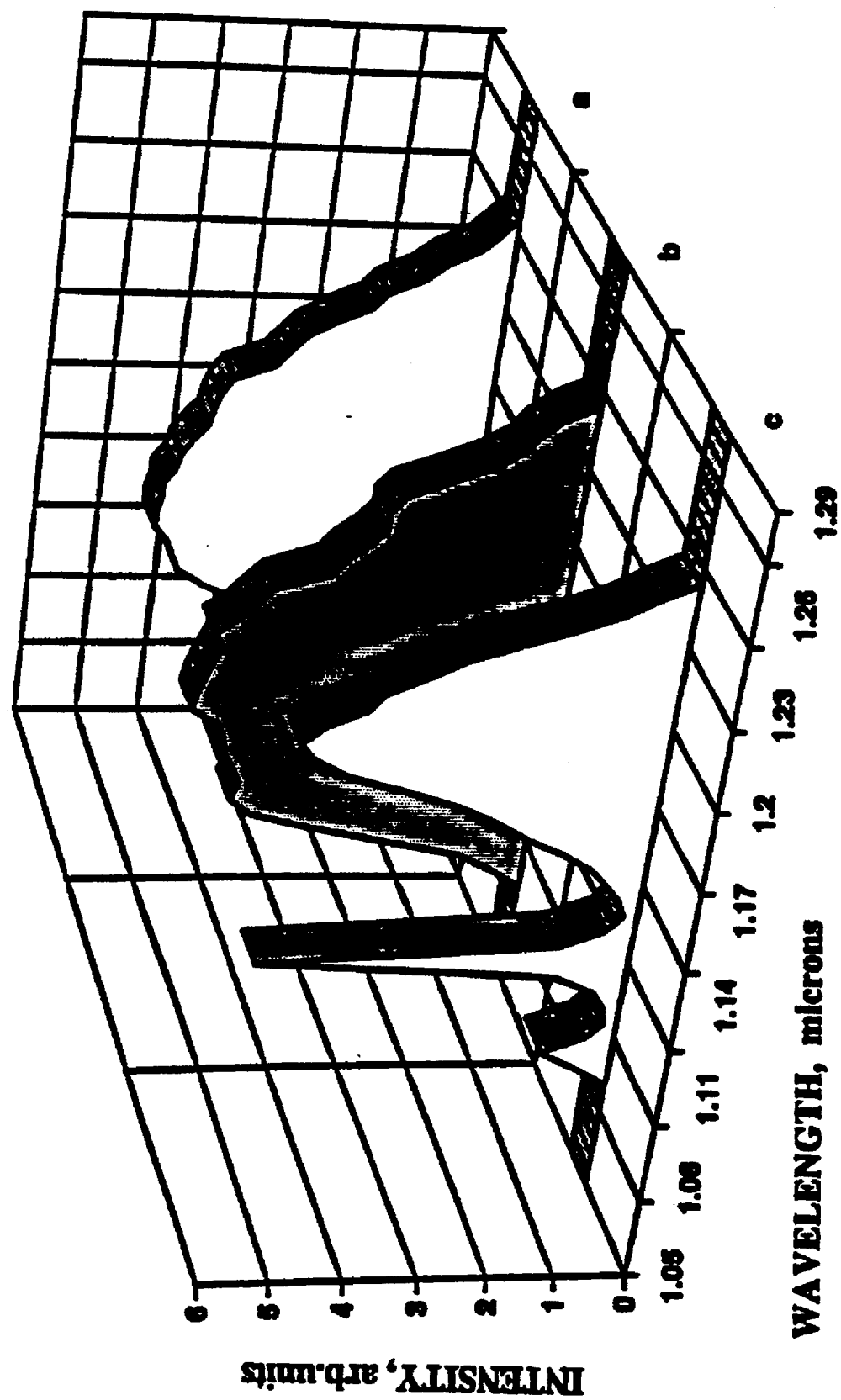
FIG. 4 is a multi-curve graph, in which graph "a" is a graph of the generated superbroadband spectrum according to the present invention; graph "b" is a graph of the luminescence spectrum of $F_2^-$ color centers in LiF; and graph "c" is a graph of the multisuperbroadband spectrum according to the present invention; graph "b" is a graph of the multifrequency laser oscillation output with the spectral coding according to the present invention.

The examples of the superbroadband spectra, obtained in the experiment with LiF:F$_2^-$ active medium are presented on FIGS. 4 (graphs or curves "a" and "b") which differed only due to the changes in the mirror $M_1$ reflectivity range. Thus FIGS. 4 (graphs or curves "a" and "b") show good coincidence of the generated superbroadband spectrum and well known luminescence spectrum of F$_2^-$ color centers in LiF, spreading from 1.08 to 1.26 μm. By placing a special filter (mask) F (See FIG. 3), or image controller into the resonator it is possible to obtain the multifrequency laser oscillation output with the special laser distribution or spectral ending (see FIG. 4 (graph "c")).

In order to obtain superbroadband output frequency doubling the lens $L_3$ was used for the disperse compensation of phase matching angles in the nonlinear crystal (NC)—LiIO$_3$. Lens $L_4$ is used to correct the output radiation and to direct it to mirror $M_3$. Mirror $M_3$ is used to reflect the output radiation to the outlet hole of the laser unit.

The positive effects and advantages of the proposed laser are:

the proposed scheme of the resonator provides an opportunity of using solid state laser elements that was impossible before;

reliable and stable, at room temperature, LiF color center crystals with high gain coefficients and wide emission spectrum work very well in the proposed scheme and provide superbroadband oscillation continuously overlapping practically the entire optical spectrum range from blue (0.42 μm) till near infrared (1.24 μm).

the aperture is mounted in the resonator in such a way that it is between the focusing and dispersive elements and has an orifice in the focus of the focusing element. This circumstance provides maximum enhancement of the quantity of the independent modes with different wavelengths and different trajectories. As a result the radiation of each mode with it's own wavelength is amplified in the active media independently from the simultaneous amplification of the rest of the wavelengths. So, modes competition is absent and spectral range of simultaneous multi-frequency generation is considerably enhanced practically to the spectral width of the active medium luminescence spectrum.

We claim:

1. Method of laser generation comprising the steps of optically pumping an active medium having a broad luminescence spectrum to produce emission radiation which contains secondary off-axis laser modes; separating from the emission radiation desired wavelengths; directing the radiation of the desired wavelengths through multiple passes through the active medium, radiation of different wavelengths being passed through different associated trajectories to stimulate emissions at the desired wavelengths; and suppressing the secondary off-axis laser modes to avoid mode competition thereby maximizing the amplification of the desired spectral components.

2. A laser having a superbroad bandwidth and capable of generation of selected spectral outputs within that bandwidth when optically pumped, the laser comprising an active medium with broadband luminescence and including different spatial regions each associated with a spectral component of a desired wavelength and producing emission radiation which includes secondary off-axis laser modes; dispersion means for dispersing the emission radiation and causing multiple passes of the spectral components through their associated spatial regions of said active medium and providing an output of desired spectral components; and suppression means for suppressing off-axis laser modes to avoid mode competition thereby maximizing the amplification of the desired spectral components.

3. Laser, according to claim 2, wherein said dispersion means comprises an end mirror on one site of said active medium and a dispersive element on the other side of said active medium.

4. Laser, according to claim 3, wherein said dispersive element comprises a focusing element and a diffraction grating.

5. Laser, according to claim 4, wherein said diffracting grating forms part of a corner reflector which includes a high reflecting mirror.

6. Laser, according to claim 5, wherein said diffraction grating and high reflecting mirror are arranged at 90° to each other.

7. Laser, according to claim 4, wherein said focusing element comprises a cylindrical lens.

8. Laser, according to claim 2, wherein said dispersion means includes a focusing element having a focal point at which emission radiation is focused and said suppression means comprises an optical blocking element which at least partially blocks the emission radiation to thereby suppress the secondary off-axis laser modes.

9. Laser, according to claim 8, wherein said optical blocking element comprises a slit aperture.

10. Laser, according to claim 2, wherein said active medium comprises a color center crystal.

11. Laser, according to claim 2, further comprising doubling means for doubling the frequencies of the output of the spectral components.

12. Laser, according to claim 2, further comprising filtering means for limiting the spectral components that are transmitted through the active medium to those components having desired wavelengths.

13. Laser, according to claim 12, wherein said filtering means is positioned between said active medium and a source of optical pumping.

14. Laser, according to claim 12, wherein said filtering means is positioned between said active medium and said dispersion means.

15. Laser, according to claim 2, wherein said active medium comprises a LiF color center crystal with at least one of $F_2^-$ and $F_2^+$ centers.

16. Laser, according to claim 2, in combination with a pumping laser for optically pumping said active medium.

17. Laser comprising means for optically pumping an active medium having a broad luminescence spectrum to produce emission radiation which contains secondary off-axis laser modes; means for separating from the emission radiation desired wavelengths; means for directing the radiation of the desired wavelengths through multiple passes through the active medium, radiation of different wavelengths being passed through different associated trajectories to stimulate emissions at the desired wavelengths; and means for suppressing the secondary off-axis laser modes to avoid mode competition thereby maximizing the amplification of the desired spectral components.

18. Laser as defined in claim 17, wherein said means for directing the radiation comprises dispersion means.

19. Laser as defined in claim 18, wherein said dispersion means comprises an end mirror on one site of said active medium and a dispersive element on the other side of said active medium.

20. Laser as defined in claim 19, wherein said dispersive element comprises a focusing element and a diffraction grating.

* * * * *